United States Patent [19]
Yamauchi

[11] Patent Number: 5,271,246
[45] Date of Patent: Dec. 21, 1993

[54] METHOD AND APPARATUS FOR PRODUCING HIGH TEMPERATURE WATER IN ABSORPTION CHILLER-HEATER

[75] Inventor: Kazuyoshi Yamauchi, Ibarakishi, Japan

[73] Assignee: Kawasaki Thermal Engineering Co., Ltd., Shigaken, Japan

[21] Appl. No.: 926,648

[22] Filed: Aug. 10, 1992

[30] Foreign Application Priority Data

Aug. 28, 1991 [JP] Japan .................. 3-242494

[51] Int. Cl.⁵ .............................. F25B 15/06
[52] U.S. Cl. ..................... 62/476; 62/324.2; 62/105
[58] Field of Search ........... 62/476, 483, 486, 101, 62/103, 105, 108, 324.2

[56] References Cited

U.S. PATENT DOCUMENTS 3,426,548 2/1969 Greacen et al. ............... 62/476
3,831,390 8/1974 Hopkins ..................... 62/101

FOREIGN PATENT DOCUMENTS 0217165 8/1989 Japan ..................... 62/476

*Primary Examiner*—John M. Sollecito
*Assistant Examiner*—William C. Doerrler
*Attorney, Agent, or Firm*—Jones, Tullar & Cooper

[57] ABSTRACT

In an absorption chiller-heater, warm water in the heat exchanger tubes of an evaporator is heated by spraying solution on the surface of the heat exchanger tubes of an evaporator, and the temperature of the solution is lowered at the same time. As a result, using a conventional low temperature solution pump, high temperature water of around 80° C. may be produced without raising the temperature of the solution. Accordingly, it is not necessary to use heat resisting materials for the solution pump, and corrosion of the materials of the apparatus is less likely to occur. At the same time, since the temperature of the parts is lowered, thermal stress of the materials decreases.

9 Claims, 8 Drawing Sheets

METHOD AND APPARATUS FOR PRODUCING HIGH TEMPERATURE WATER IN ABSORPTION CHILLER-HEATER

BACKGROUND OF THE INVENTION

The present invention relates to a method and apparatus for producing high temperature water in an absorption chiller-heater, and more particularly to a method and apparatus for producing high temperature water without raising the temperature of the solution (absorption solution).

Hitherto an absorption chiller-heater using, for example, lithium bromide as an absorbent and water as a refrigerant is generally known.

Figure 1:
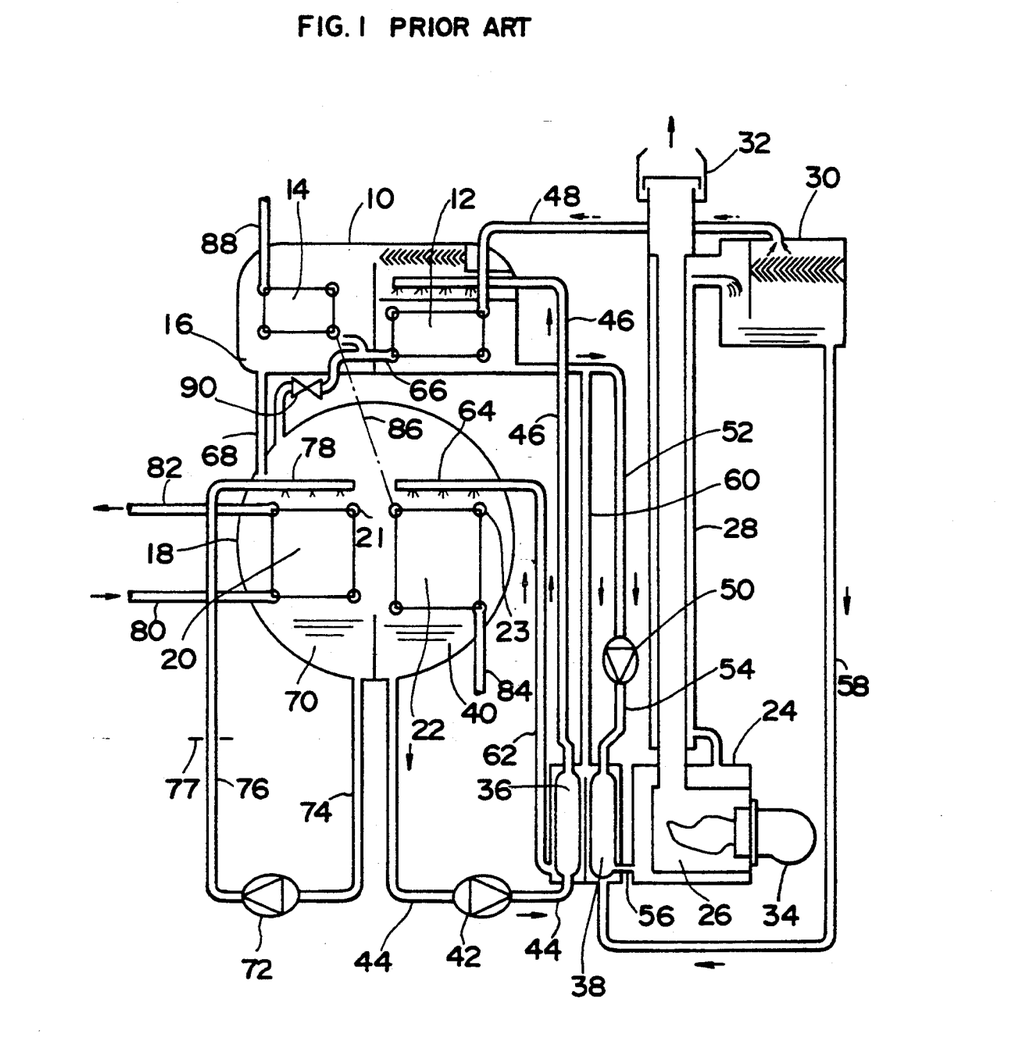
FIG. 1 is a schematic diagram showing the flow of a conventional absorption chiller-heater.

A conventional absorption chiller-heater is composed, for example, as shown in FIG. 1. Numeral 10 denotes an upper low temperature shell composed of a low temperature generator 12 and a condenser 14. A refrigerant sump 16 is disposed in the lower part in the condenser 14. Numeral 18 denotes a lower low temperature shell composed of an evaporator 20 and an absorber 22. Numeral 24 denotes a high temperature generator composed of a combustion chamber 26, a heat recovery unit 28, a vapor-liquid separator 30, an exhaust pipe 32, and a combustion unit 34. Other constituent components include, among others, a low temperature heat exchanger 36 and a high temperature heat exchanger 38.

The weak solution in a liuqid sump 40 in the lower part in the absorber 22 is sent by a low temperature solution pump 42 into the low temperature generator 12 through a solution discharge pipe 44, a low temperature heat exchanger 36 and a pipe 46. This weak solution is heated by the high temperature refrigerant vapor flowing in through a pipe 48, and is concentrated to a intermediate concentrated solution.

This intermediate concentrated solution is divided in two portions. One of the two portions is sent into the high temperature generator 24 by the high temperature solution pump 50 through pipes 52, 54, high temperature heat exchanger 38 and a pipe 56. The intermediate concentrated solution is heated by the combustion unit 34, goes up the heat recovery unit 28, enters the vapor-liquid separator 30 to be separated into a refrigerant vapor and a strong solution. The strong solution passes through the strong solution pipe 58 and high temperature heat exchanger 38 due to a pressure difference between the internal pressure of about 650 mmHg in the high temperature generator 24 and the internal pressure of about 6 mmHg in the lower low temperature shell 18, and is mixed with the intermediate concentrated solution (the other portion of the divided two) from the pipe 60 divided previously to form a mixed concentrated solution, which enters the low temperature heat exchanger 36, passes through the solution feed pipe 62, and is sprayed over the heat exchanger tubes 23 of the absorber 22 by the spray means (spray device) 64, thereby completing circulation and returning to the solution sump 40.

On the other hand, the refrigerant vapor separated in the vapor-liquid separator 30 enters the low temperature generator 12 through a pipe 48, heats the solution in it, is condensed and liquefied, and is fed into the condenser 14 through a pipe 66. In the low temperature generator 12, the refrigerant vapor generated at the time of concentration of the weak solution into intermediate concentrated solution enters the condenser 14 through the upper passage, and is condensed to be a liquid refrigerant. The condensed refrigerant water enters the evaporator 20 through a pipe 68, and is accumulated in the lower sump 70. The refrigerant water is sprayed over the heat exchanger tubes 21 of the evaporator 20 from refrigerant spray means (spray device) 78 from pipes 74, 76 by a refrigerant pump 72. Along the pipe 76, an orifice 77 is installed for metering the refrigerant water. Or, instead of the orifice 77, a valve may be installed.

Chilled water presented for cooling enters the evaporator 20 through a pipe 80, and is cooled by the latent heat of evaporation of the sprayed refrigerant, and flows out through a pipe 82. The cooling water flows out through pipes 84, 86, 88, and draws absorption heat in the absorber 22 and of the condensation heat in the condenser 14 out of the system.

By opening a cooling/heating changeover valve 90 and without flow of cooling water to the pipe 84, hot water may be obtained from the pipe 82.

As described above, in the conventional absorption chiller-heater, when producing hot water from the evaporator 20, the warm water in the heat exchanger tubes 21 in the evaporator 20 is heated by the refrigerant vapor flowing into the evaporator 20 through the cooling/heating changeover valve 90.

The solution is sprayed over the heat exchanger tubes 23 of the absorber 22, and since heat is not taken out from the absorber 22 (when producing hot water, cooling water does not flow through the heat exchanger tubes 23 of the absorber), the solution is not cooled and flows into the low temperature solution pump 42.

Accordingly, when producing high temperature water, the solution temperature becomes too high, and the heat resisting temperature of the solution pump 42 must be raised. It is, however, difficult to raise the heat resisting temperature of the solution pump 42 more than the present level.

Figure 2:
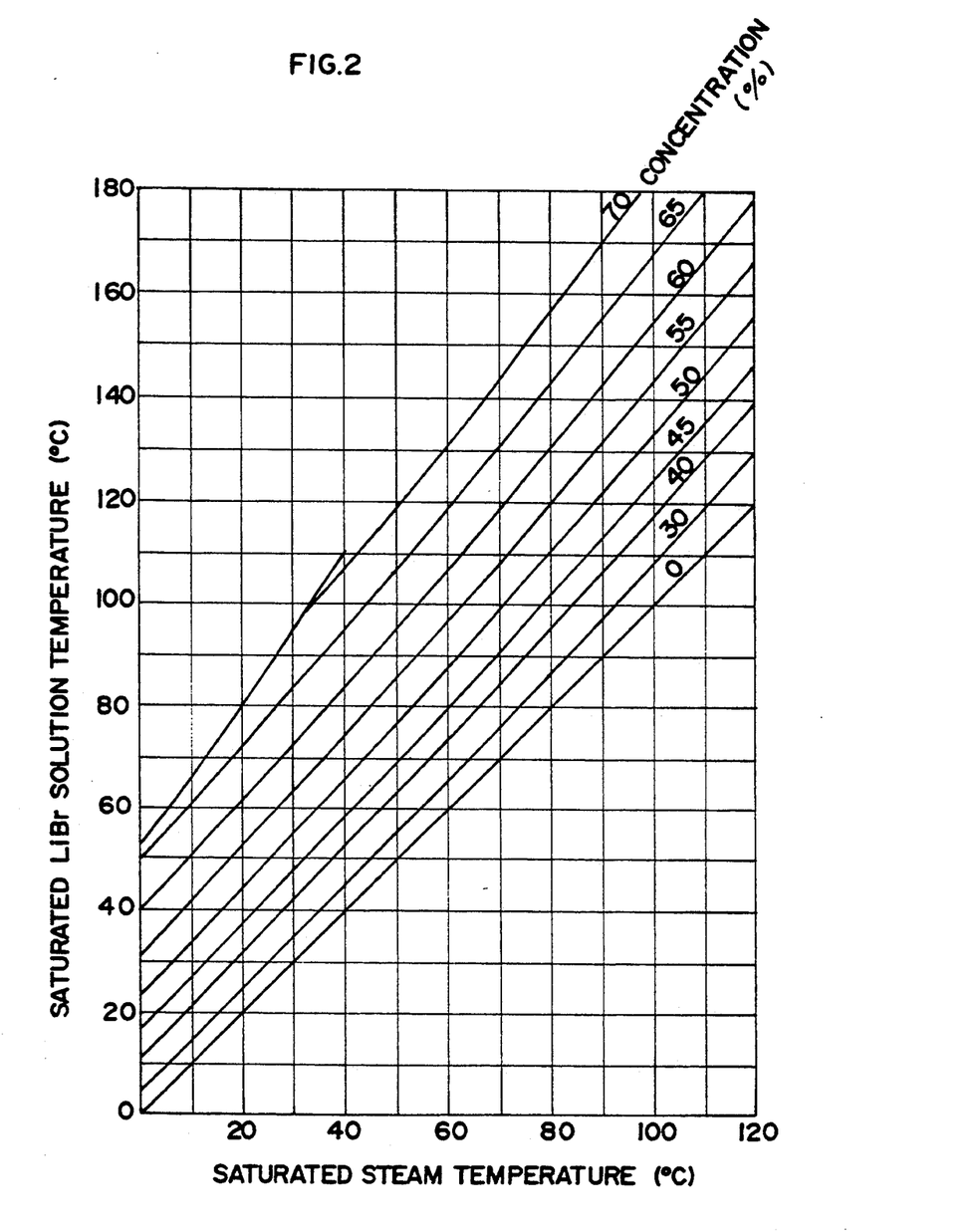
FIG. 2 is a Dühring diagram of water and lithium bromide.

FIG. 2 is a Dühring diagram of water and lithium bromide. As clear from FIG. 2, the solution temperature is higher than the saturated steam temperature.

OBJECTS AND SUMMARY OF THE INVENTION

It is hence a primary object of the invention to provide a method and apparatus for producing high temperature water, while keeping low the temperature of the solution flowing into the solution pump, by exchanging heat between the high temperature and warm water in the heat exchanger tubes of the evaporator to lower the temperature of the solution flowing into the low temperature solution pump.

To achieve the above object, the invention provides a method for producing high temperature water in an absorption chiller-heater, comprising
a step of spraying solution over the surface of heat exchanger tubes of an evaporator, and
a step of lowering the temperature of the solution by heating the warm water in the heat exchanger tubes in the evaporator with this solution.

The term "spraying" in this application involves both mere dropping of liquid or solution and atomizing of liquid or solution.

The invention also presents an apparatus for producing high temperature water in an absorption chiller-heater characterized by installing solution spraying means for producing hot water at the upper side of the heat exchanger tubes of an evaporator in the absorption chiller-heater.

The refrigerant spraying means in the conventional absorption chiller-heater shown in FIG. 1 is used for the solution spraying means. In this case, the solution is supplied into the solution spraying means as follows.

The absorption chiller-heater comprises, for example, a low temperature generator, a condenser, an absorber, an evaporator, a low temperature heat exchanger, a high temperature heat exchanger, and a high temperature generator. In this absorption chiller-heater, a solution feed pipe for feeding solution from the low temperature heat exchanger to the absorber, and a liquid sump of the evaporator are connected with a solution feed pipe having a valve. In this case, the refrigerant pump is a refrigerant pump when producing chilled water, and is a solution pump when producing high temperature water. That is, it serves as a refrigerant pump/solution pump.

Besides, a solution discharge pipe between the low temperature heat exchanger and the low temperature solution pump connected to the solution sump of the absorber, and the liquid sump of the evaporator are connected with a solution feed pipe having a valve.

Moreover, in the above absorption chiller-heater, a bypass pipe having a valve is connected to a solution circulation pipe for connecting the solution spraying means and the refrigerant/solution pump connected to the liquid sump of the evaporator.

In addition, the solution feed pipe from the low temperature heat exchanger to the absorber, and a solution pipe for connecting the refrigerant pump connected to the solution sump of the evaporator to the solution spraying means are connected with a solution feed pipe having a valve, and a valve is disposed between this connection point and the refrigerant pump.

Furthermore, the solution discharge pipe between the low temperature heat exchanger and the low temperature solution pump connected to the solution sump of the absorber, and the solution pipe for connecting the refrigerant, pump connected to the liquid sump of the evaporator to the solution spray means are connected with a solution feed pipe having a valve, and a valve is disposed between this connection point and the refrigerant pump.

In the conventional absorption chiller-heater shown in FIG. 1, in ordinary operation for obtaining a hot water of 60° C., the temperature of the solution flowing into the solution pump is about 95° C. To produce hot water of 80° C., the temperature of the solution flowing into the solution pump is as high as 115° C., which is not desired from the viewpoint of heat .resistance of the pump, and such operation cannot be continued.

On the other hand, in the absorption chiller-heater of the invention, to produce a hot water of 60° C., the temperature of the solution flowing into the solution pump is around 70° C., and to obtain hot water of 85° C., the temperature of the solution flowing into the solution pump is around 95° C.

In the invention, therefore, hot water of about 85° C. can be produced, and the high temperature water in the invention may be defined to be hot water of 80° C. or more, or preferably hot water of 70° C. or more.

DETAILED DESCRIPTION OF THE PREFERRED EMBODIMENTS

Referring now to the drawings, some of the preferred embodiments of the invention are described in detail below.

As shown in FIG. 3 to FIG. 8, the invention relates to a method for producing high temperature water in an absorption chiller-heater, comprising
a step of spraying a solution over the surface of heat exchanger tubes 21 of an evaporator 20, and
a step of lowering the temperature of the solution by heating the warm water in the heat exchanger tubes 21 in the evaporator 20 with this solution.

Explaining by reference to FIG. 3 to FIG. 8, the invention also presents an apparatus for producing high temperature water in an absorption chiller-heater characterized by installing solution spraying means 92 for use in the production of hot water at the upper side of heat exchanger tubes 21 of an evaporator 20 of the absorption chiller-heater.

As the solution spraying means 92, the refrigerant spraying means 78 in the conventional absorption chiller-heater shown in FIG. 1 is directly used. In this case, the solution is supplied into the solution spraying means 92 by the following structure.

Figure 3:
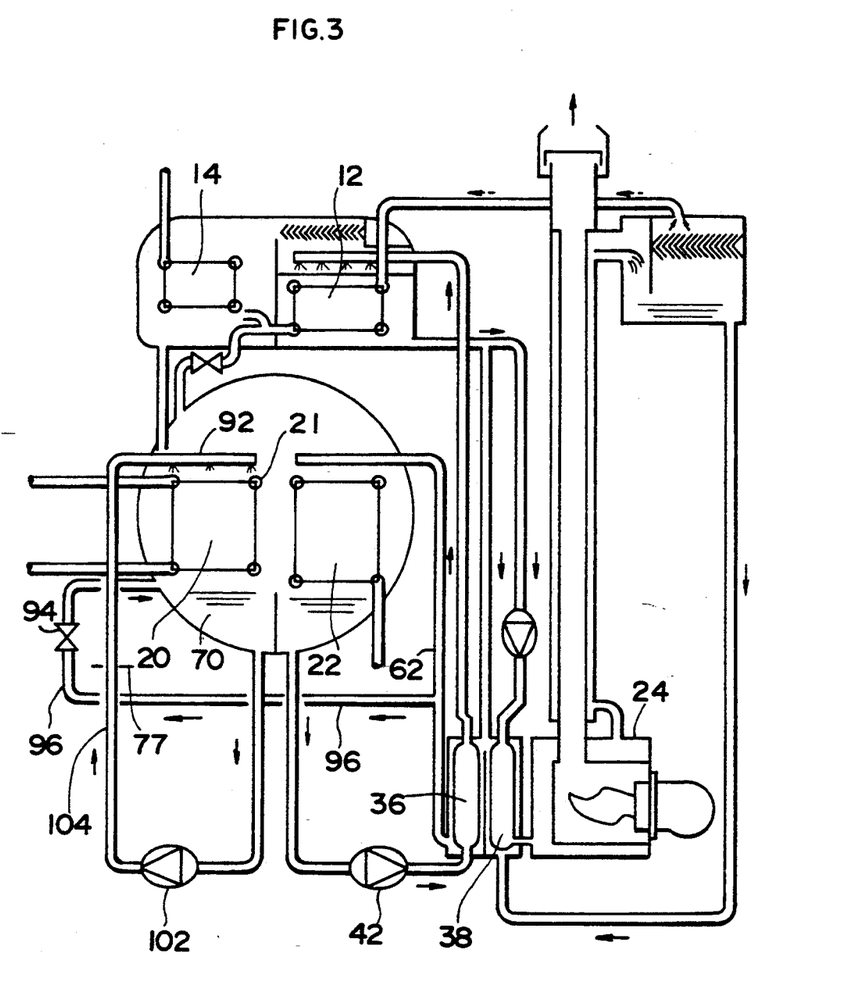
FIG. 3 is a explanatory diagram of an apparatus for producing high temperature water in an absorption chiller-heater according to an embodiment of the invention.

FIG. 3, for example, shows the absorption chiller-heater which comprises a low temperature generator 12, a condenser 14, an absorber 22, an evaporator 20, a low temperature heat exchanger 36, a high temperature heat exchanger 38, and a high temperature generator 24. In this absorption chiller-heater, a solution feed pipe 62 for feeding solution from the low temperature heat exchanger 36 to the absorber 22, and a liquid sump 70 of the evaporator 20 are connected with a solution feed pipe 96 having a valve 94. In this case, the refrigerant pump is a refrigerant pump when producing chilled water, and is a solution pump when producing high temperature water. That is, it serves as a refrigerant/solution pump 102.

Figure 5:
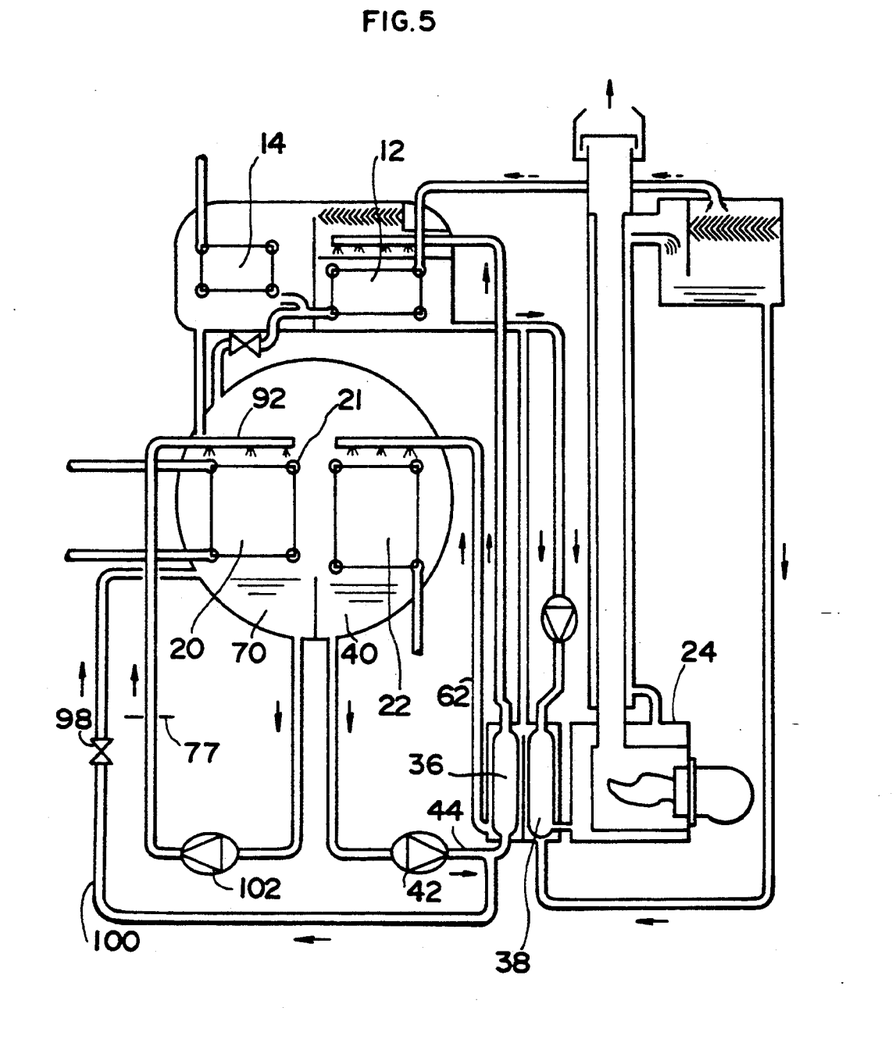
FIG. 5 is a schematic diagram of an apparatus according to get another embodiment of the invention.

Besides, as shown in FIG. 5, a solution discharge pipe 44 between the low temperature heat exchanger 36 and the low temperature solution pump 42 connected to the solution sump 40 of the absorber 22, and the liquid sump 70 of the evaporator 20 are connected with a solution feed pipe 100 having a valve 98.

Figure 4:
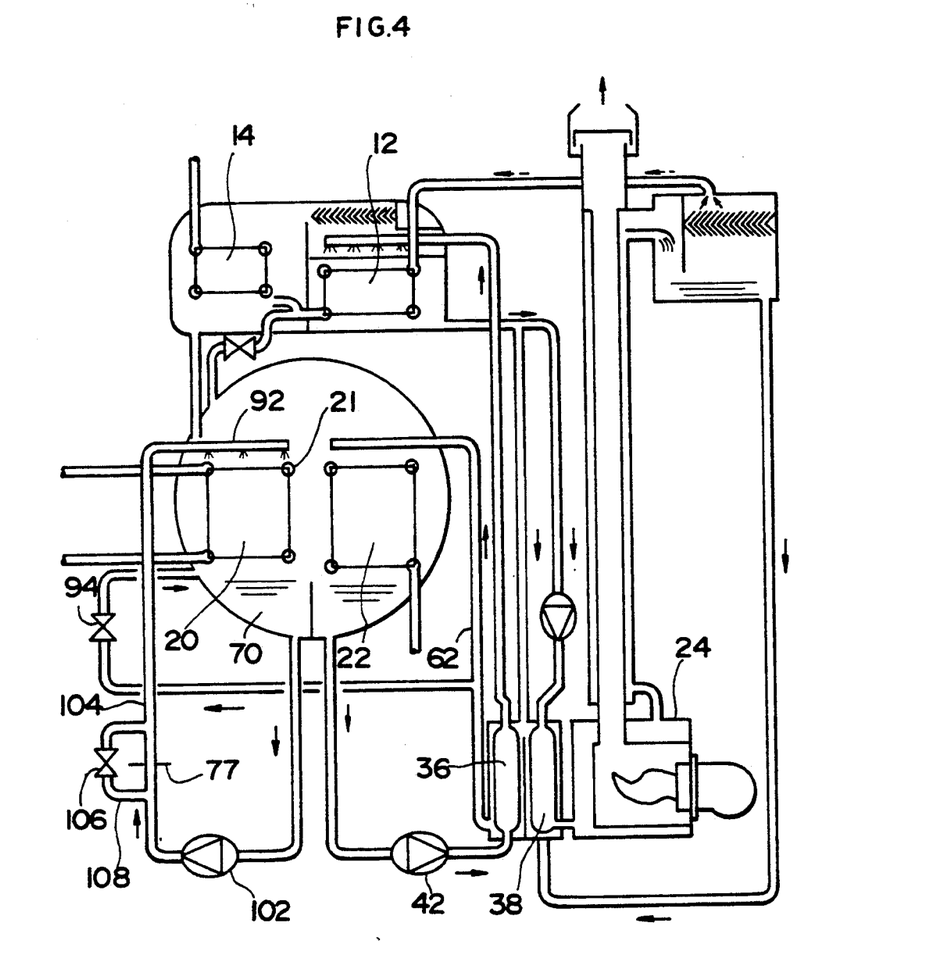
FIG. 4 is a schematic diagram of an apparatus according to another embodiment of the invention.
Figure 6:
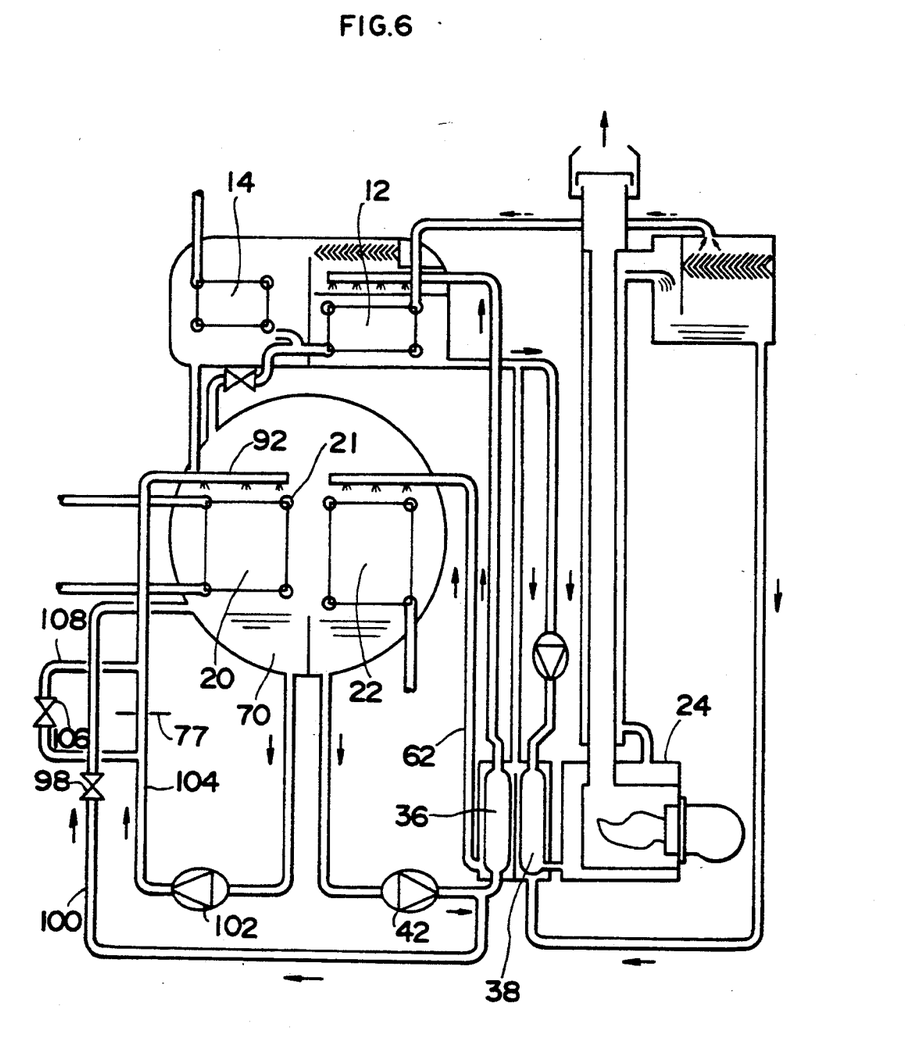
FIG. 6 is a schematic diagram of an apparatus according to yet another embodiment of the invention.

Moreover, as shown in FIG. 4 and FIG. 6, in the above absorption chiller-heater shown in FIG. 3 and FIG. 5, a bypass pipe 108 having a valve 106 is connected to solution circulation piping 104 for connecting the solution spraying means 92 and the refrigerant/solution pump 102 connected to the liquid sump 70 of the evaporator 20.

Figure 7:
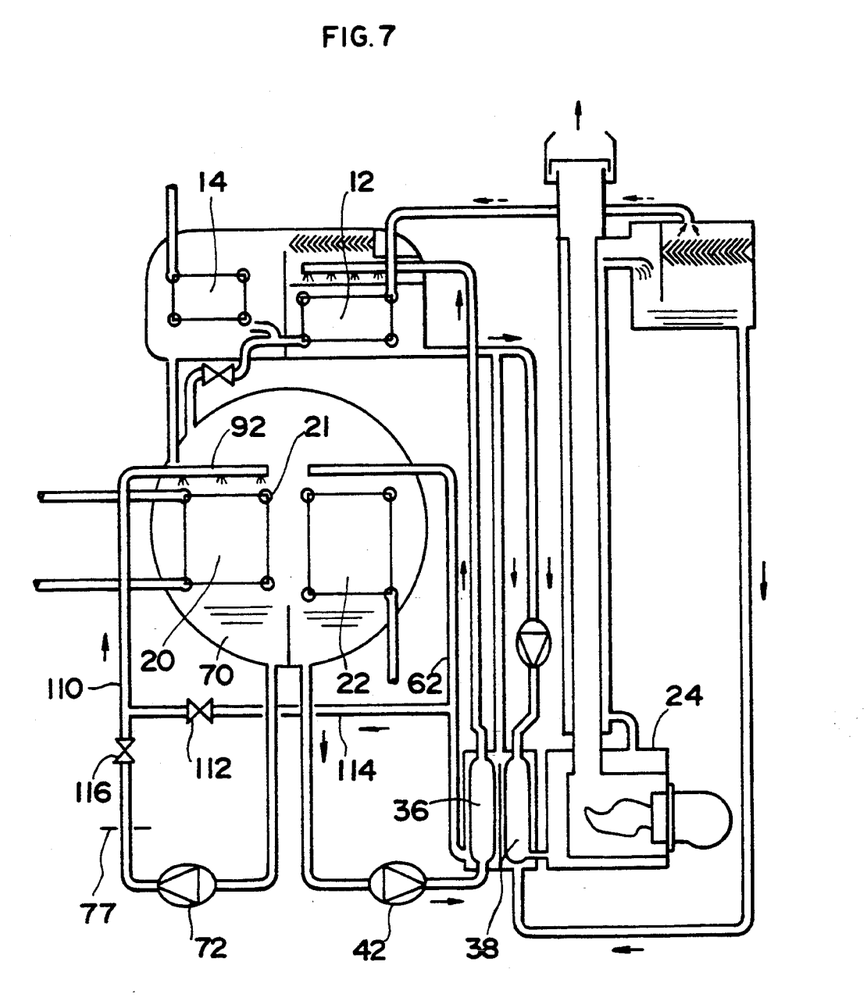
FIG. 7 is a schematic diagram of an apparatus according to yet another embodiment of the invention.

In addition, as shown in FIG. 7, the solution feed pipe 62 for feeding solution from the low temperature heat exchanger 36 to the absorber 22, and a solution pipe 110 for connecting the refrigerant pump 72 connected to the solution sump 70 of the evaporator 20 and the solution spraying means 92 are connected with a solution feed pipe 114 having a valve 112, and a valve 116 is disposed between this connection point and the refrigerant pump 72.

Figure 8:
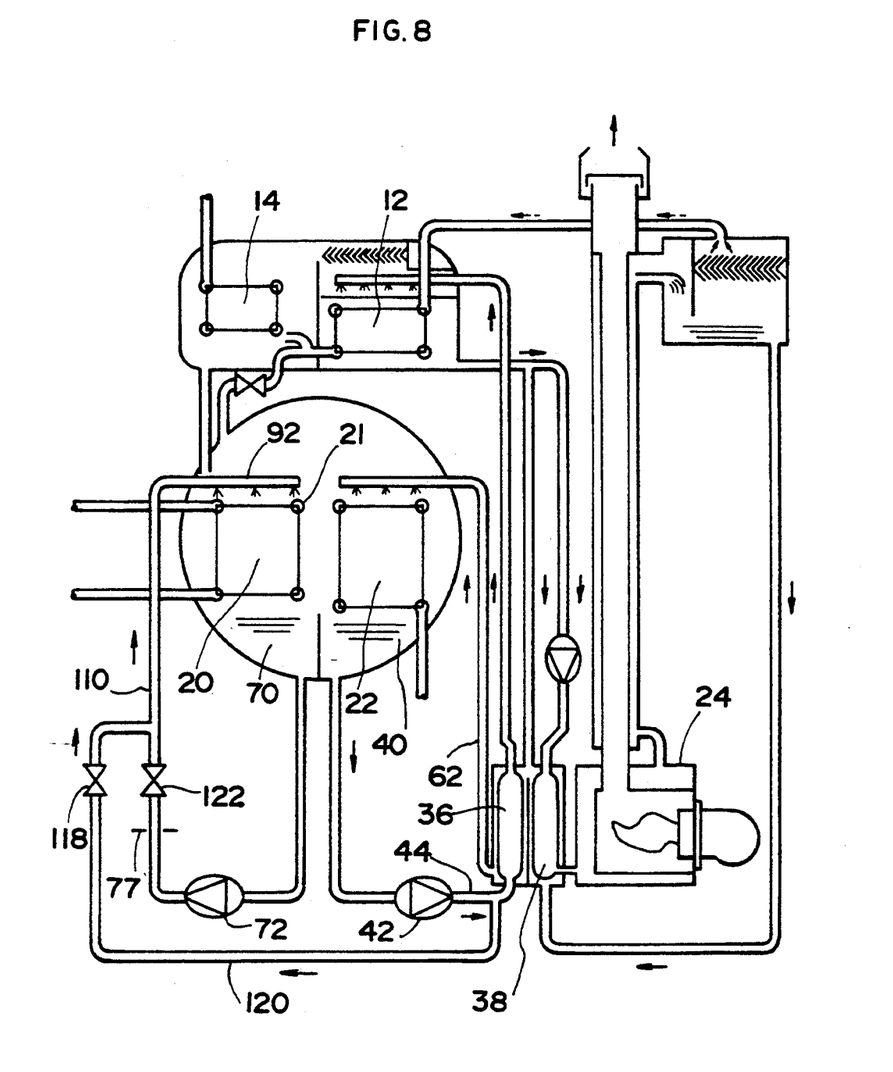
FIG. 8 is a schematic diagram of an apparatus according to yet another embodiment of the invention.

Furthermore, as shown in FIG. 8, the solution discharge pipe 44 between the low temperature heat exchanger 36 and the low temperature solution pump 42 connected to the solution sump 40 of the absorber 22, and the solution pipe 110 for connecting the refrigerant pump 72 connected to the liquid sump 70 of the evaporator 20 and the solution spray means 92 are connected with a solution feed pipe 120 having a valve 118, and a valve 122 is disposed between this connection point and the refrigerant pump 72.

In the conventional absorption chiller-heater shown in FIG. 1, in ordinary operation for obtaining hot water of 60° C., the temperature of the solution flowing into the solution pump 42 is about 95° C. To produce hot water of 80° C., the temperature of the solution flowing into the solution pump 42 is as high as 115° C., which is not desired from the viewpoint of heat resistance of the pump, and such operation cannot be continued.

On the other hand, as shown in FIG. 3 to FIG. 8, in the absorption chiller-heater of the invention, to produce hot water of 60° C., the temperature of the solution flowing into the solution pump 42 is around 70° C., and to obtain hot water of 85° C., the temperature of the solution flowing into the solution pump 42 is around 95° C.

Embodiment 1

FIG. 3 shows an embodiment of the invention. The apparatus in the embodiment, is composed by adding the solution feed pipe 96 leading from the solution feed pipe 62 between the low temperature heat exchanger 36 and the absorber 22 to the liquid sump 70 of the evaporator 20 through the valve 94, to the conventional absorption chiller-heater shown in FIG. 1.

In the operation for producing hot water, the valve 94 is opened, nd at least a part (or the whole) of the solution coming out of the low temperature heat exchanger 36 is sent into the solution sump 70 of the evaporator 20, and this solution is sprayed over the heat exchanger tubes 21 of the evaporator 20 from the solution spraying means 92 such as solution spray pipe (hereinafter called the solution spray pipe 92) by means of the refrigerant/solution pump 102.

Embodiment 2

In the apparatus of the embodiment, as shown in FIG. 4, by connecting a bypass pipe 108 having a valve 106 to the solution pipe 104, the circulation rate of the solution is increased more than in the case of Embodiment 1 so as to lower the solution temperature. Numeral 77 is an orifice. Instead of the orifice 77, a valve may be also installed. The remaining structure and function are the same as in the case of FIG. 3.

Embodiment 3

The apparatus of this embodiment is composed by adding, as shown in FIG. 5, a solution feed pipe 100 communicating from the solution discharge pipe 44 between the low temperature solution pump 42 and the low temperature heat exchanger 36 to the liquid sump 70 of the evaporator 20 through the valve 98, to the conventional absorption chiller-heater shown in FIG. 1.

In the operation for producing hot water, the valve 98 is opened, a part of the solution sent out from the low temperature solution pump 42 is sent into the liquid sump 70 of the evaporator 20, and the solution is sprayed over the heat exchanger tubes 21 of the evaporator 20 from the solution spray pipe 92 by the refrigerant/solution pump 102.

Embodiment 4

In apparatus of the embodiment, as shown in FIG. 6, by connecting a bypass pipe 108 having a valve 106 to the solution circulation pipe 104, the circulation rate of solution is further increased more than in the case of Embodiment 3 to further lower the temperature of the solution. Numeral 77 is an orifice. Instead of the orifice 77, a valve may be also used. The remaining structure and function are same as in FIG. 5.

Embodiment 5

The apparatus of this embodiment is composed by adding, as shown in FIG. 7, a solution feed pipe 114 communicating from the solution feed pipe 62 between the outlet of the low temperature heat exchanger 36 and absorber 22 to the outlet piping of the refrigerant pump 72 through valve 112, and a valve 116 at the outlet of the refrigerant pump 72, to the conventional absorption chiller-heater shown in FIG. 1.

In the operation for producing hot water, the valve 116 is closed, and the valve 112 is opened, and at least a part of the solution coming out of the low temperature heat exchanger 36 is sprayed over the heat exchanger tubes 21 of the evaporator 20 from the solution spray pipe 92.

Embodiment 6

The apparatus of this embodiment is composed by adding, as shown in FIG. 8, a solution feed pipe 120 communicating from the solution discharge pipe 44 between the outlet of low temperature solution pump 42 and low temperature heat exchanger 36 to the outlet pipe of the refrigerant pump 72 through valve 118, and a valve 122 of the outlet part of the refrigerant pump 72, to the conventional absorption chiller-heater shown in FIG. 1.

In the operation for producing hot water, the valve 118 is opened and the valve 122 is closed, and a part of the solution sent out from the low temperature solution pump 42 is sprayed over the heat exchanger tubes 21 of the evaporator 20 from the solution spray pipe 92.

Being thus composed, the invention brings about the following effects.

(1) High temperature water is produced without raising the solution temperature. Accordingly, the problem of heat resistance of the low temperature solution pump is solved, and a conventional low temperature solution pump may be used.

(2) Since the solution temperature is low, the materials in the apparatus is less corrosive. At the same time, since the temperature of the parts is lowered, thermal stress is less.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for producing high temperature water in an absorption chiller-heater having an evaporator with heat exchanger tubes, the method comprising the steps of:
   passing water at a given temperature through the heat exchanger tubes of the evaporator;
   heating a solution at a temperature which is higher than the given temperature of the water;
   spraying solution over the surface of the heat exchanger tubes of an evaporator; and
   lowering the solution temperature by heating the water in the heat exchanger tubes in the evaporator with this solution.

2. In an apparatus for producing high temperature water in an absorption chiller-heater including an evaporator having heat exchanger tubes through which the water flows, the improvement comprising: means for providing a solution at a temperature higher than the water temperature; and solution spray means connected to said means for providing the solution located at the upper side of the heat exchanger tubes of said evaporator for spraying the solution onto said heat exchanger tubes and producing the high temperature water.

3. An apparatus for producing high temperature water in an absorption chiller-heater, comprising: a low temperature generator; a condenser; and absorber having heat exchanger tubes through which the water flows; an evaporator; a high temperature generator; a low temperature generator, said absorber and said evaporator; a high temperature heat exchanger operatively associated with said low temperature generator and said high temperature generator; and solution spray means operatively associated with said evaporator through which solution at a higher temperature than the water is sprayed onto said heat exchanger tubes.

4. An apparatus for producing high temperature water in an absorption chiller-heater of claim 3, wherein said evaporator defines a liquid sump, said apparatus further comprising: a solution feed pipe connected to said low temperature heat exchanger and operatively associated with said absorber for feeding solution from said low temperature heat exchanger to said absorber; and a further solution feed pipe being connected to said solution feed pipe and the liquid sump defined by said evaporator, said further solution feed pipe having a valve.

5. An apparatus for producing high temperature water in an absorption chiller-heater, comprising: a low temperature generator; a condenser; an absorber defining a liquid sump; an evaporator defining a liquid sump; a low temperature heat exchanger connected to the liquid sump defined by said absorber and the liquid sump defined by said evaporator, and operatively associated with said low temperature generator and with said absorber; a high temperature heat exchanger connected to said high temperature generator and to said low temperature generator; a high temperature generator; a low temperature solution pump connected to the sump defined by said absorber; a solution discharge pipe connecting said pump to said low temperature heat exchanger, said low temperature solution pump and said solution discharge pipe establishing the connection of said low temperature heat exchanger to the liquid sump defined by said absorber; and a solution feed pipe connected to said low temperature heat exchanger for establishing the connection of said low temperature heat exchanger to the liquid sump defined by said evaporator and for establishing the association of said low temperature heat exchanger to said low temperature generator, said solution feed pipe having a valve.

6. An apparatus for producing high temperature water in an absorption chiller-heater of claim 4, further comprising: a refrigerant/solution pump connected to the liquid sump defined by said evaporator; a circulating pipe; solution spray means operatively associated with said evaporator; and a bypass pipe having a valve, said bypass pipe being connected to said solution circulation spray means and said refrigerant/solution pump.

7. An apparatus for producing high temperature water in an absorption chiller-heater of claim 5, further comprising: a refrigerant/solution pump connected to the liquid sump defines by said evaporator; a circulating pipe; solution spray means operatively associated with said evaporator; and a bypass pipe having a valve, said bypass pipe being connected to said solution circulation pipe for connecting said solution spray means and said refrigerant/solution pump.

8. An apparatus for producing high temperature water in an absorption chiller-heater of claim 3, wherein the evaporator defines a liquid sump, the apparatus further comprising: a refrigerant pump connected to the liquid sump defined by said evaporator; solution spray means operatively associated with said evaporator; a solution feed pipe connected to said low absorber for feeding solution from said low temperature heat exchanger to said absorber, a further solution pipe for connecting said refrigerant pump and said solution spray means, said further solution feed pipe having a valve; and a further valve disposed between the connection point with the further solution feed pipe and the refrigerant pump.

9. An apparatus for producing high temperature water in an absorption chiller-heater, comprising: a low temperature generator; a condenser; an absorber defining a liquid sump; an evaporator defining a liquid sump; a low temperature heat exchanger connected to the liquid sump defined by said absorber and the liquid sump defined by said evaporator, and operatively associated with said low temperature generator and with said absorber; a high temperature heat exchanger connected to said high temperature generator and to said low temperature generator; a high temperature generator; a low temperature solution pump connected to the sump defined by said absorber; a solution discharge pipe connecting said pump to said low temperature heat exchanger, said low temperature solution pump and said solution discharge pipe establishing the connection of said low temperature heat exchanger to the liquid sump defined by said absorber; solution spray means operatively associated with said evaporator; a solution pipe having a valve, said solution pipe connecting the refrigerant pump to said solution spray means; and a solution feed pipe having a valve, said solution feed pipe being connected to said solution pipe connecting the refrigerant pump to said solution spray means.

* * * * *

UNITED STATES PATENT AND TRADEMARK OFFICE
CERTIFICATE OF CORRECTION

PATENT NO. : 5,271,246

DATED : December 21, 1993

INVENTOR(S) : Kazuyoshi Yamauchi

It is certified that error appears in the above-identified patent and that said Letters Patent is hereby corrected as shown below:

Claim 3, column 7, line 31, "and" should be "an"; and line 34, "heat exchanger operatively associated with said low temperature" should be inserted between "temperature" and "generator".

Claim 6, column 8, line 16, "pipe for connecting said solution" should be inserted after "circulation".

Claim 8, column 8, line 34, "temperature heat exchanger and operatively associated with said" should be inserted between "low" and "absorber".

Claim 9, column 8, line 60, "a refrigerant pump connected to the sump defined by said evaporator;" should be inserted between the ";" and "a".

Signed and Sealed this

Twenty-fourth Day of May, 1994

Attest:

BRUCE LEHMAN

Attesting Officer     Commissioner of Patents and Trademarks